No. 701,770. Patented June 3, 1902.
J. T. SMITH.
MACHINE FOR TREATING FLAX OR HEMP STRAW.
(Application filed Sept. 7, 1900. Renewed June 17, 1901.)
(No Model.) 2 Sheets—Sheet 2.

WITNESSES

INVENTOR.
JOHN T. SMITH
BY Paul H Hawley
HIS ATTORNEYS

UNITED STATES PATENT OFFICE.

JOHN T. SMITH, OF HERON LAKE, MINNESOTA.

MACHINE FOR TREATING FLAX OR HEMP STRAW.

SPECIFICATION forming part of Letters Patent No. 701,770, dated June 3, 1902.

Application filed September 7, 1900. Renewed June 17, 1901. Serial No. 64,930. (No model.)

*To all whom it may concern:*

Be it known that I, JOHN T. SMITH, of Heron Lake, Jackson county, Minnesota, have invented certain new and useful Improvements in Machines for Treating Flax or Hemp Straw, of which the following is a specification.

The invention relates to machines for treating flax and hemp straw.

The object of my invention is to provide an apparatus adapted for use in threshing grain and wherein the straw may be directed to a series of crushing-rolls to be reduced to tow or fiber or diverted from the crushers and passed directly out of the machine from the straw-rack.

A further object is to provide means for separating the seeds and chaff and collecting the same beneath the crushers to the end that the stock when discharged from the crushing-rolls will be cleaned of all refuse material, and the seeds that are dislodged from the straw or from the seed-bolls that are broken by the crushers will be saved.

Other objects of the invention will appear from the following detailed description.

My invention consists generally in various constructions and combinations, all as hereinafter described, and particularly pointed out in the claims.

Figure 1:
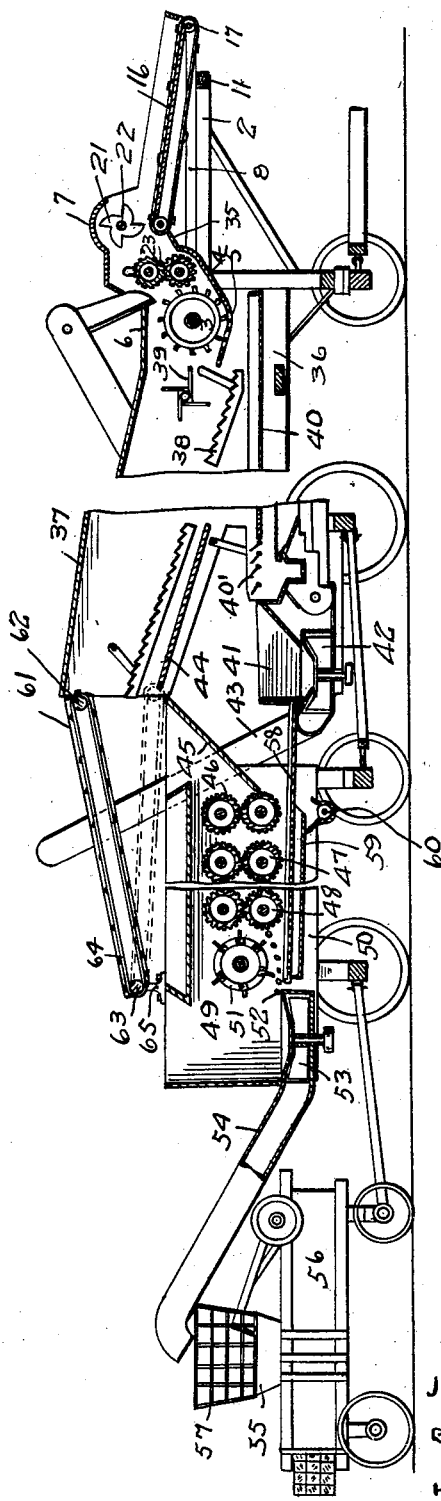
Figure 2:
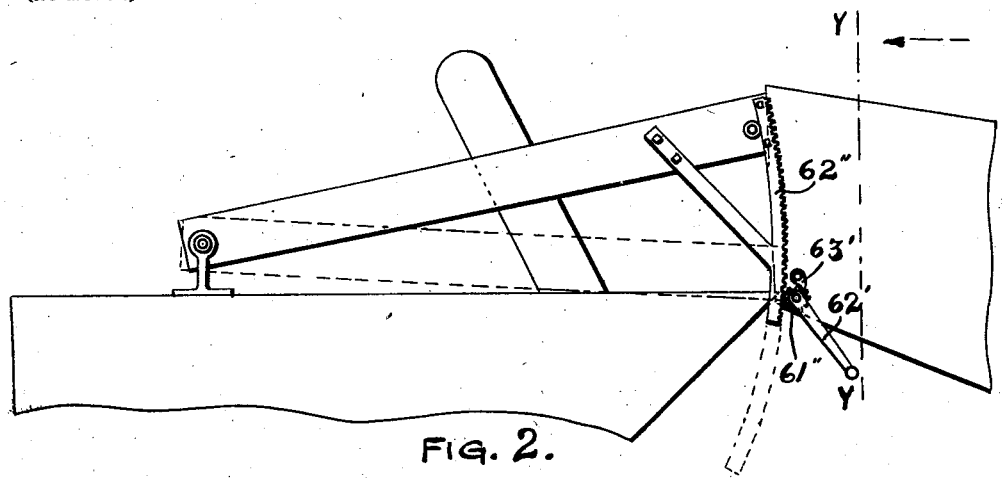
Figure 3:
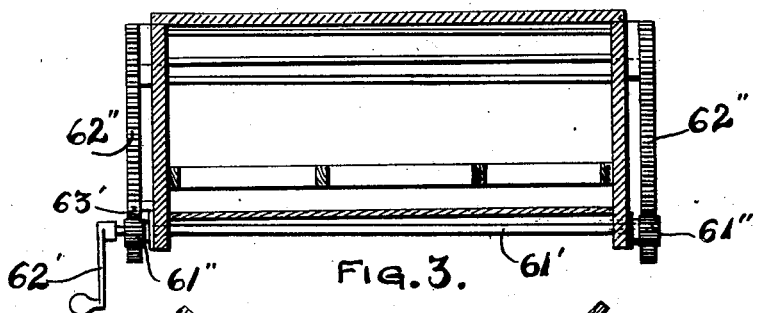
Figure 4:
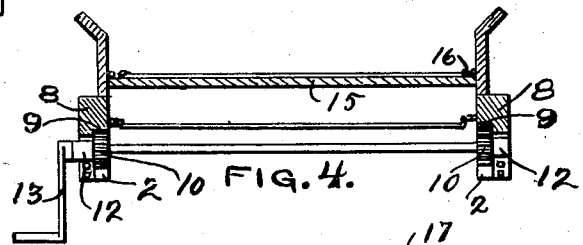
Figure 5:
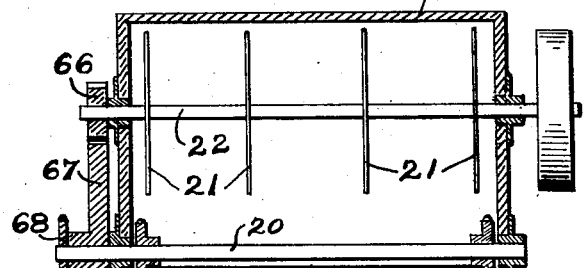

In the accompanying drawings, forming part of this specification, Figure 1 is a longitudinal section of the machine embodying my invention. Fig. 2 is a side elevation of a portion of the machine, showing the swinging carrier and the means for operating the same. Fig. 3 is a section on the line *y y* of Fig. 2. Fig. 4 is a section taken through the bundle-carrier shown in Fig. 1 at the right-hand end thereof. Fig. 5 is a similar view taken through the right-hand end of the machine near the band-cutters.

In the drawings, 2 represents a suitable frame whereon the preferred style of band-cutting and feeding mechanism is arranged. Near the inner end of said frame I provide a threshing-cylinder 3, beneath which is a concave plate 4, preferably toothless, having a series of perforations 5. Above the cylinder 3 I arrange a casing 6, joined to an arched casing 7, arranged over the feeding and band-cutting mechanism. The casing 7 is supported upon suitable bars 8, and above said bars I provide an inclined floor 15, over which a slatted conveyer 16 operates, driven by any suitable means. A shaft 22 is mounted near the inner end of said conveyer, on which I arrange a series of band-cutting knives 21. Between the band-cutter and the threshing-cylinder I have shown a pair of feeding-rolls 23 and 24, arranged one above the other, having corrugated surfaces adapted to coact to crush the straw and seed-bolls that are fed between them. The shaft of the upper roll is vertically movable in slots in the casing and permits the roll to move vertically to accommodate itself to the bunches or bundles of straw that are fed to the rolls. Between the plate 4 and the carrier I prefer to arrange a feed-board 35 to direct the flax and hemp from the carrier to the rolls. At the outer end of the frame 2 I have shown a gear mechanism 11, operated by a suitable crank, (not shown,) by means of which the bars 8, the carrier, and crushing-rolls may be moved away to permit access to the cylinder. 36 is a wheeled frame supporting a casing 37, wherein an inclined shaking-rack 38 is mounted in position to receive straw from the threshing-cylinder. Above the rack 38 are the usual revolving beaters 39. The chaff and fine material that fall from the rack are caught up by a floor 40 and from thence passes over a rake 40' to a hopper 41, that leads to a blast-fan 42 and a suitable chaff-discharge pipe 43 at the side of the machine. The seeds fall through the rakes into the transverse conveyer 41' and from thence to the repeat 41.

Beneath the upper end of the straw-rack is an inclined floor 44, that is adapted to collect the fine material from the upper portion of the rack and deposit the same upon the floor 40, to be conveyed back to the hopper.

Under the discharge end of the straw-rack is a removable plate 45, that is adapted to receive the straw from the rack and deliver it to a series of corrugated crushing-rolls 46, 47, and 48, that are arranged in pairs and mounted within a casing 49 on a wheeled frame 50. A beater 51, mounted in said casing near the crushing-rolls, receives the material therefrom and beats it thoroughly over a grating 52, and finally delivers it to a blast-fan 53, that is connected with a pipe 54, through which the material is discharged into the hopper 55 of a baling-press 56. On the hopper 55 I prefer to arrange a supplementary hopper 57, having openings in its walls to permit the escape of air when the straw is blown out of the spout or pipe 54 into the hopper of the baler. Beneath the series of crushing-rolls I prefer to provide a perforated floor 58, over which the chaff passes to the hopper 41, while the seeds and fine material fall through upon a plate 59 and pass to a transverse conveyer 60. When the operator desires to pass the straw directly to the baler without crushing and breaking the same, he may lower the carrier 61, that is mounted on shafts 62 and 63, that are supported in a suitable frame 64 and pivoted on standards 65 on the casing 49. Any suitable means may be provided for raising or lowering the free end of said frame; but I prefer to employ the device shown in Figs. 2 and 3, which consists of a shaft 61', provided with pinions 61'' and with a crank 62'. Toothed rack-bars 62'' are provided on the swinging frame and in engagement with said pinions, and a pawl 63', provided on said frame, is adapted to engage one of said pinions and lock the same against rotation. This rack-and-pinion mechanism is a very common one in machines of this character, and I claim no novelty in its construction and application to the carrier frame. When the carrier is lowered to the position indicated by dotted lines in Fig. 1, its receiving end will be beneath the discharge end of the straw-rack and the straw instead of falling upon the plate 45 and passing through the crushing-rolls will be carried over them and delivered to the blast-fan and blown out through the pipe 54 to the baling-press. I am able, therefore, by a simple adjustment of the carrier 61 to control the passage of the straw to the crushing-rolls. If the operator desires to take the straw directly from the threshing-machine and bale it without passing it through the crushing and beating process, he can do so by adjusting the receiving end of said carrier opposite the discharge end of the straw-rack. If at any time he wishes to subject the straw to a crushing and beating process, he raises the carrier to the position indicated by full lines in Fig. 1 and the straw will then fall upon the inclined plate 45 and pass into the rolls. As the chaff and fine material are separated from the straw in the threshing-machine, it follows that the crushing-rolls act only upon clean straw and deliver in consequence a better grade of fiber to the baling-press.

It is not necessary for the operator to handle the straw from the time it is delivered to the band-cutter and feeder until it passes in a bale from the baling-press. The operations of threshing, cleaning, breaking, and crushing and baling are successive and continuous. The mechanisms require no attention except the adjustment of the pivoted conveyer to regulate the passage of the material through the crushing-rolls or over them.

Various ways may be devised for driving the mechanism herein described; but I prefer to drive the band-cutter from the threshing-cylinder and the crushing-rolls by a belt from the cylinder and operate the baler through a belt on the crushing-rolls. Only two belts are therefore needed to drive the apparatus, and as the threshing devices, crushing and beating mechanism, and the press, if desired, are arranged in tandem the belts will operate in a direct line from the threshing-cylinder and no power will be wasted in transmission.

I make no claim in this application to the construction of the band-cutting and feeding mechanism, nor to the pneumatic stacker whereto the material is delivered from the crushing-rolls, nor to the baling-press, as these devices form the subject-matter of separate inventions.

Having thus described my invention, I claim as new and desire to secure by Letters Patent—

1. The combination, with a threshing-cylinder and concave, of a straw-rack whereto the material is delivered from said cylinder, a guide or feed board provided beneath the discharge end of said rack, a series of crushing-rolls provided near said straw-rack to receive the material from said feed-board, and a vertically-swinging carrier provided above said crushing-rolls and adapted to drop below the discharge end of said straw-rack and divert the material from said feed-board and crushing-rolls, substantially as described.

2. The combination, with a threshing-cylinder and concave, of a shaking straw-rack adapted to receive material therefrom, a removable feed-board provided beneath the discharge end of said straw-rack, crushing-rolls to receive the material from said feed-board, a vertically-swinging carrier provided above said crushing-rolls and adapted to drop below said straw-rack and divert the material from said feed-board and crushing-rolls, and a blast-fan arranged to receive the material from said crushing-rolls and from the discharge end of said carrier.

3. The combination, with a threshing-cylinder and concave, of a shaking straw-rack adapted to receive the material from said cylinder, a floor 40 beneath the lower end of said rack to receive the chaff and refuse material therefrom, a floor 44 beneath the upper portion of said rack and adapted to direct the material falling thereon to the receiving-floor 40, a hopper near the discharge end of said floor 40, a blast-fan communicating therewith, a series of crushing-rolls adapted to receive the straw from the discharge end of said rack and crush the woody portions and unbroken seed-bolls, a perforated floor beneath said crushers adapted to discharge the fine material falling thereon into said hopper, a seed pan or plate beneath the perforated portion of said floor, and a conveyer to receive the seeds from said pan, substantially as described.

4. The combination, with a shaking straw-rack, of a feed-board beneath the discharge end of the same, a series of crushing-rolls provided near said feed-board and adapted to receive the straw from said rack and crush the woody portions and separate the fiber therefrom, a beater adapted to receive the material from said crushers, a perforated floor provided beneath said crushers and beater, a hopper adapted to receive the chaff and fine material falling upon said floor from said crushers, a blast-fan connected with said hopper, a seed-pan provided beneath the perforated portions of said floor, and a transverse conveyer adapted to receive the seeds from said pan.

5. The combination, with a threshing-cylinder and concave, of a straw-rack whereto the material is delivered from said cylinder a series of crushing-rolls provided near the discharge end of said rack to receive the straw therefrom, and a vertically-swinging carrier provided above said crushing-rolls and adapted to drop its free end below the discharge end of said rack, whereby the material will be diverted from said rolls, substantially as described.

6. The combination, with a straw-rack and feed-board provided beneath the discharge end of said rack, of a series of crushing-rolls adapted to receive the straw from said feed-board, and a vertically-swinging carrier provided above said crushing-rolls and adapted to drop below the discharge end of said rack to divert the straw from said feed-board and said rolls, substantially as described.

7. The combination, with a shaking straw-rack, of floors whereon chaff and fine material are discharged from said rack, a hopper adapted to receive the chaff and waste material from said floors, a blast-fan connected with said hopper, a discharge-pipe through which the waste material is directed to the side of the machine, a feed-board provided beneath the discharge end of said rack, crushing-rolls to receive the straw from said board, and means provided beneath said crushing-rolls and adapted to receive the chaff therefrom and direct it to said hopper, substantially as described.

8. The combination, with a shaking straw-rack, of the floors provided beneath the same and adapted to receive the chaff and other waste material, a hopper beneath said rack and adapted to receive the chaff from said floors, a blast-fan connected with said hopper, a discharge-pipe extending laterally with respect to said hopper and fan and through which the waste material is directed to the side of the machine, a feed-board beneath the discharge end of said rack, crushing-rolls adapted to receive the straw from said feed-board, means provided beneath said crushing-rolls to receive the chaff and fine material therefrom and direct it to said hopper, means for receiving the seeds separated from the straw by the action of the crushers, and a conveyer whereto the seed so separated is delivered, substantially as described.

9. The combination, with a shaking straw-rack, of a feed-board beneath the discharge end of the same, a series of crushing-rolls provided near said feed-board and adapted to receive the straw from said rack and crush the woody portions and separate the fiber therefrom, a perforated floor provided beneath said crushers, a hopper adapted to receive the chaff and fine material falling upon said floor from said crushers, a blast-fan connected with said hopper and a discharge-pipe through which the waste material falling into said hopper is directed to the side of the machine, substantially as described.

10. The combination, with a threshing-cylinder, of a straw-rack whereon the straw is delivered from said cylinder, floors provided beneath said rack to receive the chaff and other waste material, a transverse conveyer to receive the seeds from said floors, a repeat-elevator connected with said conveyer and adapted to return the seeds to said cylinder, a hopper provided near the discharge end of said floors to receive the chaff and waste material therefrom, a blast-fan connected with said hopper, a feed-board beneath the discharge end of said rack, crushing-rolls to receive the straw from said feed-board, and means provided beneath said rolls for receiving the chaff therefrom and delivering it to said hopper, substantially as described.

11. The combination, with a threshing-cylinder and concave, of a shaking straw-rack adapted to receive the material from said cylinder, a floor 40 beneath the lower end of said rack to receive the chaff and refuse material therefrom, a floor 44 beneath the upper portion of said rack and adapted to direct the material falling thereon to said floor 40, a hopper near the discharge end of said floor 40, a blast-fan communicating therewith, a series of crushing-rolls adapted to receive the straw from the discharge end of said rack to crush the woody portions and unbroken seed-bolls, and means provided beneath said crushers to receive the fine material falling therefrom and direct it into said hopper, substantially as described.

12. In a machine for treating flax and hemp straw, the combination with straw-shaking means, of a mechanism located beneath said shaking means to receive the chaff therefrom and deposit it at the side of the machine, crushing-rolls provided near said straw-shaking means, a feed-board near the discharge end of said shaking means to direct the straw therefrom to said rolls, and means provided beneath said rolls to direct the chaff separated thereby to said chaff-receiving mechanism, substantially as described and for the purpose specified.

13. In a machine for treating flax and hemp straw, the combination with a shaking straw-rack, of means located beneath said rack to receive the chaff therefrom and convey it to one side of the machine, a feed-board beneath the discharge end of said rack, crushing-rolls near said feed-board to receive the straw therefrom, and a perforated floor provided beneath said crushers to receive the chaff and the seeds separated by the action thereof, and said conveyer being adapted to direct the chaff back to the chaff-receiving mechanism beneath said rack, while the seeds pass through said perforations, substantially as described.

14. In a machine for treating flax and hemp straw, the combination, with the threshing-cylinder, of a shaker whereto the straw is delivered from said cylinder, means provided beneath said shaker to receive the chaff and other waste material therefrom and direct it to the side of the machine, a transverse conveyer to receive the seeds separated by the action of said shaker, a repeat-elevator connected with said conveyer and adapted to return the seeds to said cylinder, a feed-board provided beneath the discharge end of said rack, crushing-rolls to receive the straw from said board, and means provided beneath said rolls to receive the chaff therefrom and convey it back to the chaff-receiving means beneath said shaker, substantially as described and for the purpose specified.

In witness whereof I have hereunto set my hand this 3d day of September, 1900.

JOHN T. SMITH.

In presence of—
 RICHARD PAUL,
 M. E. GOOLEY.